United States Patent Office 3,433,737
Patented Mar. 18, 1969

3,433,737
METHOD OF REDUCING TOXICITY OF WASTE STREAMS CONTAINING ORGANIC THIOCYANATE COMPOUNDS
Donald Clifford Wehner, Stamford, Conn., assignor to American Cyanamid Company, Stamford, Conn., a corporation of Maine
No Drawing. Filed Nov. 23, 1965, Ser. No. 509,407
U.S. Cl. 210—49     4 Claims
Int. Cl. B01d 21/01; C02b 1/20

ABSTRACT OF THE DISCLOSURE

Waste effluent streams containing spent mother liquor and wash liquid resulting from the synthesis of organic thiocyanate compounds such as methylene bisthiocyanate are rendered non-toxic by adding sufficient alkali to raise their pH to at least 9, followed by separation of the resulting decomposition products.

---

This invention relates to pollution abatement and more particularly to a method of reducing or substantially eliminating the toxicity of waste streams containing spent mother liquor and wash liquid resulting from the synthesis of organic thiocyanate compounds.

By "organic thiocyanate compound(s)" is meant any of the numerous known organic compounds, containing one or more thiocyanate (—SCN) or isothiocyanate (—NCS) radicals attached to carbon, which are toxic in varying degrees to one or more species of microorganism (bacteria, fungi, algae), pest (insects, mites, nematodes), undesirable plant growth, and the like.

Such thiocyanates may be aliphatic, aromatic, alicyclic, heterocyclic and they may be simple organic thiocyanates which also contain oxygen, nitrogen, sulfur, chlorine, bromine, iodine, and the like elements. Among such compounds may be mentioned methylene bisthiocyanate, trans dithiocyanoethylene, 1,2-dihalo-1,2 - dithiocyanoethane, mono-, di- and tri-chloro and -bromo thiocyanates; esters of thiocyanic acid and aliphatic alcohols such as hexyl thiocyanate, cyclohexyl thiocyanate, stearyl thiocyanate, oleyl thiocyanate, terpinyl thiocyanate, bornyl thiocyanate, fenchyl thiocyanate, isobornyl thiocyanate, methylcyclohexyl thiocyanate, hexyl thiocyanoacetate, cyclohexyl thiocyanoacetate, octyl thiocyanoacetate, octyl thiocyanopropionate, terpinyl thiocyanoacetate, bornyl thiocyanoacetate, fenchyl thiocyanoacetate, terpinyl thiocyanopropionate, terpinyl thiocyanobutyrate, beta-thiocyanoethyl propionate, beta-thiocyanoethyl thiocyanoacetate, beta-thiocyanoethyl laurate, beta-thiocyanoethyl stearate, beta-thiocyanaoethyl benzoate, butyloxyethyl thiocyanate, butyloxyethyl thiocyanoacetate, beta-butoxy-beta'-thiocyanodiethyl ether, glycerol thiocyanate distearate, benzyl thiocyanoacetate, styrol dithiocyanoacetate, glycol dithiocyanoacetate, diphenylamine dithiocyanate, furfuryl thiocyanoacetate, butyl thiocyanate, lauryl thiocyanate, and cetyl thiocyanate; and organo thiocyanoacrylates such as aliphatic esters of thiocyanoacetic acid, α-thiocyanopropionic acid, β-thiocyanopropionic acid, thiocyanobutyric acid, and the like. These and other thiocyanates are disclosed, including synthesis and use, in the literature, such as U.S. Patents 2,214,971, 2,486,090, 2,572,564, 2,650,240, 3,205,247, 3,212,963, and German Patent 1,157,603.

Disposal of spent mother liquor and wash liquid resulting from synthesis of thiocyanate compounds is a considerable problem, assuming massive proportions in plant scale manufacture, since even minute amounts of unrecovered thiocyanate injected into streams, rivers, holding ponds and the like can kill or injure plant, animal, and vegetative life dependent thereon.

Various methods have been proposed for elimination of the thiocyanate pollutant. For example, conversion of unrecovered thiocyanate to non-toxic compounds has been attempted by treatment of spent mother liquor and wash liquid with a sodium polysulfide, e.g., $Na_2S_3$. Other methods include refluxing in water or with 5% sulfuric acid to hydrolyze to other products, treatment with sodium hypochlorite or chlorine gas to bleach the thiocyanates, and attempted reversal of the synthesis reaction by addition of a thiocyanate salt. These methods have proved inoperative, or if somewhat effective, uneconomical.

According to the present invention, it has been discovered that the toxicity of waste streams containing spent mother liquor and wash liquid, due to the presence of minor amounts of an organic thiocyanate compound, may be substantially reduced or eliminated by providing in said water streams a pH sufficient to decompose said organic thiocyanate compound, and thereafter separating the resultant decomposition product. The method has the advantages of convenience, economy, and effectiveness as will become more evident in the following illustrative description of the synthesis of a typical highly toxic organic thiocyanate compound, methylene bisthiocyanate.

Methylene bisthiocyanate is conveniently prepared by heating methyl dibromide or diiodide and an alkali metal or ammonium thiocyanate at about 60–70° C. in a non-aqueous solvent medium as follows:

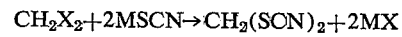

$$CH_2X_2 + 2MSCN \rightarrow CH_2(SCN)_2 + 2MX$$

wherein X is a halogen and M is alkali metal or ammonium ion. Typical nonaqueous solvents are alcohols such as methanol or ethanol, acetonitrile, dimethylformamide, dimethylsulfoxide, dimethylacetamide, and lower aliphatic ketones such as acetone. When methanol is the solvent, the thiocyanate product is precipitated from the mother liquor by addition of water and separated by conventional means such as filtration, centrifugation, and the like. The thiocyanate product is then repeatedly washed with large volumes of water. The spent mother liquor and wash water is then discarded into waste streams.

Alternatively, a solvent reaction medium may be employed in which the byproduct salt is insoluble, the thiocyanate product being soluble. In this case, the salt cake is separated, by filtration for example, and repeatedly washed with the solvent for the thiocyanate product in order to reduce the amount of the latter on the byproduct salt. The solution of thiocyanate may be concentrated or the product may then be precipitated with water as desired.

In either preparation, it will be evident that minor amounts of toxic thiocyanate product will remain in the spent mother liquor or in the wash water or other wash liquid used to separate solvent or byproduct from precipitated organic thiocyanate or byproduct salt cake.

Generally, the pH required to decompose the minor or trace amounts of organic thiocyanate product in the waste stream containing spent mother liquor or wash liquid will be on the alkaline side and preferably at least 9. Alkalinity is provided by adding an alkaline material in an amount effective to give an alkaline pH.

A great variety of alkaline materials are suitable, including individual compounds, mixtures, and buffered solutions or dispersions. Typical alkaline materials are the alkali and alkaline earth metal hydroxides such as lithium, sodium, potassium, magnesium, calcium, and barium hydroxide; ammonium hydroxide; basic salts such as sodium carbonate and alkyl guanidine acetates and carbonates; amines such as butylamine, dibutylamine, ethylhexylamine, diethylhexylamine, ethylenediamine, diethylenetriamine, triethylenetetramine, tetraethylenepentamine, hydroxyethyl ethylenediamine, propylenediamine, diethylaminoethanol, morpholine, monoethanolamine, diethanolamine, triethanolamine, and the like.

Buffered alkaline reagents are effective as well. For example, the aqueous equimolar solution of $K_2HPO_4$ (pH about 9) and $KH_2PO_4$ (pH about 4.8) will provide an alkaline pH. Preferably, a strongly basic reagent will be employed, e.g., sodium, potassium or ammonium hydroxide, in order to provide a pH of at least about 9.

The alkaline material is added to the waste stream and mixed with the spent mother liquor and wash liquid for a time and at a temperature sufficient to cause substantially complete decomposition of organic thiocyanate compound. Decomposition will be evident by formation of a precipitate and generally also by a mercaptan (garlic-like) odor. Room temperature or heating at a temperature up to the boiling point of the treated liquid is effective. Time of treatment and temperature are therefore not critical. The alkaline material may be added directly or as solutions or dispersions, e.g., dilute or concentrated aqueous solutions.

Completeness of decomposition may be determined by standard analytical procedures and the decomposition products may be separated by any convenient means such as filtering, settling, centrifugation, and addition of conventional flocculants. The purified spent mother liquor and wash liquid is then either recycled for further utilization or is discarded into a waste stream, river, or the like.

The following examples further illustrate the invention but are not limitative thereof except as indicated in the appended claims. All parts and percentages are by weight unless otherwise specified.

EXAMPLE 1

Methyl dibromide was reacted with sodium thiocyanate in methanol to obtain methylene bisthiocyanate which was then precipitated by addition of water. The major portion of product methylene bisthiocyanate was separated by filtering and washing of the filter cake, leaving 361 grams of spent mother liquor and wash water containing a total of 1.09% by weight methylene bisthiocyanate. This mixture had a pH of about 3.5. To this mixture was added portions of a 5% aqueous sodium hydroxide solution until the pH was above 10. The fine white precipitate which resulted was easily separated by settling and filtering. Vapor phase chromatographic assay of the filtrate showed no methylene bisthiocyanate present. This was confirmed by microbial assay. A total of only 2.28 grams of sodium hydroxide was used in the destruction of the methylene bisthiocyanate.

In contrast with the foregoing caustic treatment, 1,980 grams of 5.6% aqueous sodium hypochlorite were required for treatment of 300 grams of substantially the same spent mother liquor and wash water as described above before tests for thiocyanate ion were negative. This treatment generated acids and it was therefore also necessary to add 36 grams of 25% aqueous sodium hydroxide solution to neutralize the solution before discharge into the sewage system.

From the foregoing it will be evident that the method of the invention affords a convenient and economical means for destroying the toxicity of waste streams containing spent mother liquors and wash liquids resulting from the synthesis of organic thiocyanate compounds as compared with known treatments such as the hypochlorite process described above.

EXAMPLE 2

In substantially the same manner as in Example 1, a waste stream containing wash liquid from the synthesis of monochloromethyl thiocyanate (preparable as in Example 1 of German Patent 1,157,603) is treated with an amount of an aqueous sodium hydroxide solution sufficient to raise the pH above 9. This treatment decomposes the monochloromethyl thiocyanate, thereby abating the toxicity of the stream caused by the presence of this compound.

I claim:

1. A method of reducing the toxicity of waste streams of the group consisting of spent mother liquor and wash liquid resulting from the synthesis of an organic thiocyanate compound and containing toxic amounts of said compound which comprises adding sufficient alkaline material to said waste streams to provide an alkaline pH of at least 9, mixing said alkaline material with said waste streams for a time and at a temperature sufficient to cause substantially complete decomposition of said organic thiocyanate compound, and thereafter separating the resulting decomposition product.

2. A method as in claim 1 wherein the organic thiocyanate compound is methylene bisthiocyanate.

3. A method as in claim 1 wherein the organic thiocyanate compound is monochloromethyl thiocyanate.

4. A method as in claim 1 wherein the alkaline material is an alkali metal hydroxide.

References Cited

UNITED STATES PATENTS

| 2,029,959 | 2/1936 | Urbain | 210—54 X |
| 2,486,090 | 10/1949 | Abramovitch | 260—454 |
| 2,572,564 | 10/1951 | Himel et al. | 260—454 |
| 3,129,262 | 4/1964 | Laufer | 260—454 X |

OTHER REFERENCES

V. Evans, Metal Industry, Sept. 10, 1954, Effluents in the Metal Finishing Industries, pp. 211–214.

SAMIH N. ZAHARNA, Primary Examiner.

W. S. BRADBURY, Assistant Examiner.

U.S. Cl. X.R.

260—59, 454